Oct. 12, 1948.   LE ROY J. WHITE ET AL   2,451,368
HOSE HANDLING APPARATUS
Filed Oct. 11, 1945   5 Sheets-Sheet 1

Fig.1.

INVENTORS
LeRoy J. White and
John F. White,
BY Edwin E. Woodhouse
ATTORNEY Oct. 12, 1948.  LE ROY J. WHITE ET AL  2,451,368
HOSE HANDLING APPARATUS
Filed Oct. 11, 1945  5 Sheets-Sheet 3

INVENTORS
LeRoy J. White and
John F. White
By Edwin E. Woodhouse
ATTORNEY

Patented Oct. 12, 1948

2,451,368

UNITED STATES PATENT OFFICE 2,451,368

HOSE HANDLING APPARATUS

Le Roy J. White and John F. White,
Wilmington, Del.

Application October 11, 1945, Serial No. 621,810

10 Claims. (Cl. 214—95)

This invention relates to apparatus for hanging hose and the like in a drying tower or rack, and to methods of operating such apparatus, and more particularly to a method and apparatus for automatically raising a section of hose from the bottom of a tower to the top of the tower, transferring the hose to a rack, removing a section of dried hose from the rack and lowering it to the bottom of the tower.

It has been proposed previously to dry fire hose and the like in a drying tower. Such a tower is a high structure, higher than the length of a section of hose, which has, attached to one or more walls thereof and near the top, a rack on which sections of hose are hung by their ends. Such towers are also provided with catwalks near the top for an operator who transfers the hose from the hose elevator to the rack and from the rack to the hose elevator. The hose elevator has usually been a simple rope-and-pulley arrangement with the pulley attached to the top of the tower above the rack. This apparatus has generally required the manual transfer of the hose from the elevator to the rack and from the rack to the elevator. This is a slow, hazardous and laborious operation which has greatly limited the use of hose-drying towers, even though such towers result in large economies by preserving the hose.

It is an object of our invention to provide a method and apparatus whereby hose and the like may be quickly and safely hung in a tower or rack and removed therefrom. A further object is to provide a method and apparatus for automatically raising a hose or the like from the ground, hanging the hose on a rack, removing a hose from the rack and lowering the hose to the ground. Another object is to provide means for mechanically, and preferably automatically, transferring a hose from a hose elevator to a hose rack in the top of a hose-drying tower. Still another object is to provide a novel hose rack for a hose-drying tower. A still further object is to provide a novel hose elevator apparatus. Another object is to provide a novel adapter for suspending a hose from a hose rack and which is particularly adapted for use in combination with our novel hose rack and hose elevator. Other objects are to advance the art. Still other objects will appear hereinafter.

The above and other objects may be accomplished in accordance with our invention by apparatus of the character hereinafter described, one embodiment of which is shown in the attached drawings, and the hereinafter described method of operating the same.

In its broadest aspect, our invention is directed to apparatus for hanging fire hose, oil-well tubing, sucker rods and the like from racks positioned at the tops of hose-drying towers, derricks, rigs or like devices for suspending the hose, etc., in a vertical position. Since our apparatus is particularly designed for hanging fire-hose, it will be described in detail hereinafter as applied to fire-hose, it being understood, however, that such description applies equally to hanging oil-well tubing, sucker rods, etc.

Broadly, the apparatus comprises the usual drying tower, a hose rack positioned near the top of the tower, a hose elevator for engaging an end of a section of hose and elevating it from the bottom of the tower to the level of the hose rack, and automatically operated mechanical means for transferring the hose from the hose elevator to the hose rack. The apparatus is particularly designed for hanging sections of hose, each having a pair of lugs projecting outwardly for a substantial distance from opposite sides of one end thereof, said lugs being permanently attached to an end of each section of hose or being provided by an adapter especially designed therefor and which may be attached to, or detached from, the section of hose at will.

Another important feature of our invention is a novel hose rack comprising spaced, outwardly extending rack arms having transverse lug-receiving notches in their upper edges and lug engaging surfaces sloping upwardly and backwardly to the notches to assist in positioning a hose in the rack and which operate, in conjunction with other apparatus, to automatically transfer a hose from a hose elevator to the rack.

Another very important feature of our invention is a novel hose elevator which comprises a pair of spaced elevator arms having transverse lug-receiving notches in their upper edges. Preferably, such hose elevator includes lug-engaging surfaces sloping upwardly and backwardly to the notches of the elevator arms to assist in the positioning of the hose in the elevator arms and being particularly adapted to operate, in conjunction with other apparatus, to automatically transfer a hose from a hose rack to the elevator arms.

A still further feature of our invention comprises safety means associated with the hose rack and cooperating with the hose elevator and transfer means to prevent accidents and damage to the apparatus and to persons by an inadvertent attempt to place a hose in a rack position, or in the elevator arms, when another hose occupies such rack position or such elevator arms.

Our invention will be more clearly understood from the following description when taken with the accompanying drawings illustrating a preferred embodiment of our invention.

In the drawings,

Fig. 7 is a side view in cross-section, taken on the line 7—7 of Fig. 6;

Referring in more detail to the drawings, wherein like numerals of reference indicate corresponding parts in the various figures, 12 represents a section of the wall of a hose-drying tower of conventional construction.

Figures 2, 8, 9:
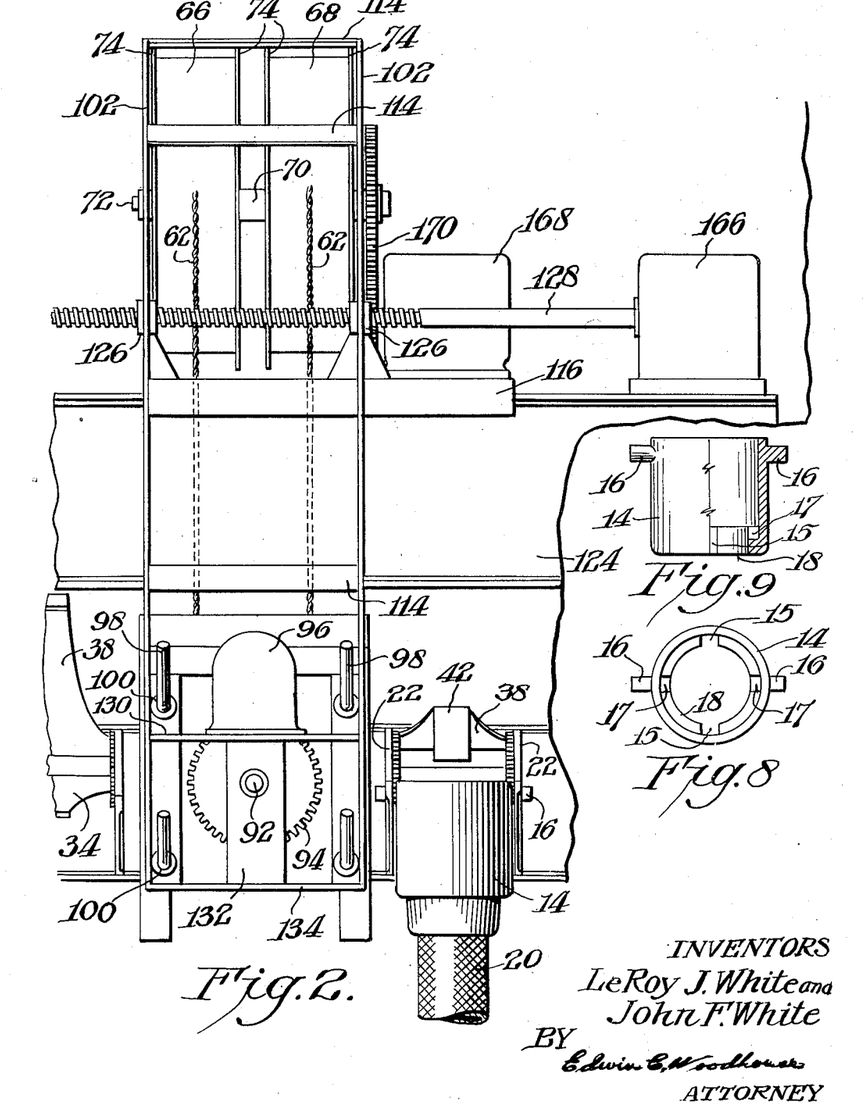
Fig. 2 is a rear view of the apparatus of Fig. 1, looking in the direction of the arrow "A"
Fig. 8 is a plan view of the adapter.
Fig. 9 is a side view of the adapter, with parts broken away and parts in section for clearness of illustration.

For the hanging of a section of hose in a hose tower, it is generally desired to provide outwardly projecting lugs on opposing sides of one end of each section of hose by which the section of hose is hung from the rack. Ordinarily, the rack comprises a plurality of spaced pairs of arms having transverse notches in their upper surfaces to receive the lugs. However, hoses come in various sizes, and particularly of various diameters. On the other hand, it is generally desired to provide hose racks in which the pairs of arms are spaced standard distances apart. In order to enable the use of racks of standardized size and to enable the hanging of different sized hose therein, one feature of our invention comprises a hose adapter 14 having a cylindrical body portion adapted to fit between a pair of rack arms. Projecting outwardly from opposite sides of the cylindrical body portion are lugs 16 of substantial length for engaging the notches in the arms of the hose rack. These lugs may be of any shape, but, for use in combination with our preferred form of apparatus, they should have rounded surfaces and should be substantially cylindrical in form. At one end of the cylindrical body portion of the adapter 14, there will be provided hose-engaging means, as at 18, which will be of a size and form to engage a hose 20 of the size to be hung and of a form corresponding to that for fastening sections of the particular hose together. In the form shown in Figs. 8 and 9, the hose-engaging means consists of an inturned flange having two diametrically opposed vertical slots 15 for the passage of lugs on the end of the hose to a position above the flange, and two diametrically opposed recesses 17 in the upper surface of the flange, positioned at an angle of 90° from the slots and adapted to receive the lugs of the hose so that the end of the hose will not become accidentally disengaged from the adapter.

The hose rack may be of the usual form with substantially rectangular pairs of thin arms provided with transverse lug-receiving notches in their upper edges. However, for use in accordance with our preferred embodiment, each rack arm will be a thin arm 22 of substantial height having its outer vertical edge sloping upwardly and backwardly, as at 24, to a peak at 26, then downwardly and rearwardly, as at 28, to form a transverse notch, and then substantially vertically, as at 30, from the back of the notch for a substantial distance above the outer edge of the notch at 26. The back edge 30 may be cut back slightly for a distance above the notch to provide a surface sloping upwardly and rearwardly so as to aid in the mechanical removal of a hose from the rack arms. The rack arms may be fastened to and supported on the wall 12 of the tower by any suitable means, which in this case is shown as U-shaped girder 32.

Each pair of rack arms may be provided with safety means which, as shown, comprises a downwardly extending arm 34 connected by gearing 36 to upper arm 38. The lower arm 34 is normally pressed forward by a spring 40 so as to hold the arm 38 in its upward and rearward inoperative position, shown in dotted lines in Fig. 1. The arm 38 has a downwardly depending flat face 42, at the outer end thereof, adapted to engage corresponding safety means in the elevator arms, to be hereinafter described. When a hose is positioned in the rack arms, it engages the lower arm 34 and forces it to the rear. This causes the arm 38 to extend forward, as shown in the solid lines in Fig. 1.

The elevator, in its preferred construction in accordance with our invention, comprises a pair of spaced, forwardly extending thin arms 44 of substantial height normally positioned outward beyond the ends of the rack arms. These elevator arms are substantially U-shaped in horizontal cross-section, connected by an arcuate back portion 46. The forward vertical edge of each elevator arm slopes upwardly and backwardly, as at 48, for a substantial portion of its height to a peak at 50, then downwardly and backwardly, as at 52, to form a transverse, lug-receiving notch, and then upwardly and slightly forwardly from the back of the notch, as at 54, for a substantial distance above the forward edge of the notch. These arms are spaced apart by a distance slightly greater than the rack arms and are beveled on their inner forward surfaces as at 56, so as to provide for slight errors in the positioning of the elevator arms relative to the rack arms. The rack arms are similarly beveled as at 58 for the same purpose.

The elevator arms are attached to and supported by the inner surfaces of the legs of a thin U-shaped frame 60, which is positioned in the vertical plane of the notches of the elevator arms. The inner edges of the legs of the frame 60 are cut away, as at 61, opposite the notches in the elevator arms to permit passage of the ends of the lugs therethrough. The upper horizontal portion of such frame 60 is attached to the lower ends of cables 62, which, in turn, are supported by and wound on a drum 64.

The drum, as shown, may be made in two cylindrical sections 66 and 68, rigidly connected together as at 70 and supported on a shaft 72. The drum is adapted to be revolved by a motor 168 through gearing 170. Each section of the drum is provided with flanges, as at 74, to retain the cables on their respective sections.

Figure 6:
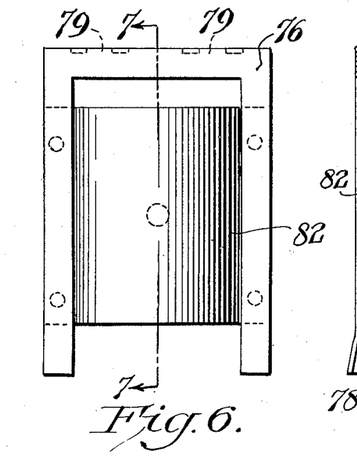
Fig. 6 is a front view of the guide for the elevator, separated from the rest of the apparatus.
Figure 10:
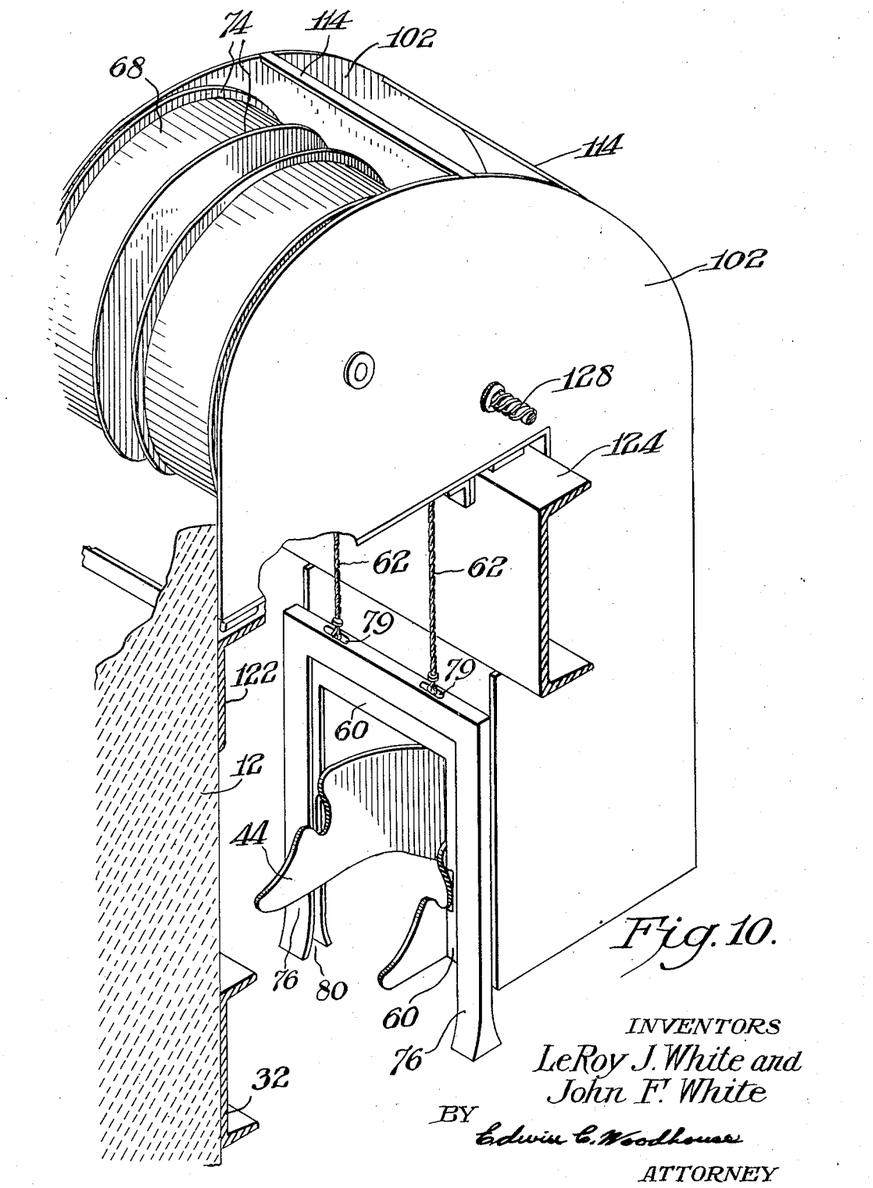
Fig. 10 is a perspective view of the hose elevator apparatus with the safety means omitted for clearness of illustration.

A guide 76 is positioned opposite the rack. This guide is in the form of an inverted U-shaped, double-walled member of slightly larger dimensions than the elevator frame 60. The walls of the guide member are spaced apart by a distance slightly greater than the thickness of the elevator frame 60, so as to form a guide-way 78 adapted to receive the frame 60. The walls of the guide member are preferably spread apart at their lower ends to form a flared opening for the frame 60. The upper horizontal wall, connecting the two vertical walls of the guide member, is provided with apertures 79 for the cables 62.

The legs of the guide member are connected together by a substantially semi-circular rear wall 82 of slightly larger diameter than the back portion 46 of the elevator arms. To the rearward surface of the back portion 82, there is attached a bearing 84 having a groove 86 to receive a pin 88 carrying a swivel connection 90 connecting a drive shaft 92 to the guide member. The drive shaft 92 is threaded similarly to a worm gear and is connected by suitable gearing 94 to a motor 96 for moving the guide member toward and away from the rack. Guide rods 98 are secured to the back of the legs of the guide member 76 for supporting the guide member and guiding its movement in the desired path. These rods 98 are supported in bearings 100, shown as ball bearings, secured to the frame 102. Preferably, these guide rods are curved to conform with the arc through which the elevator arms move when the guide member is moved toward and away from the hose rack, with the elevator arms and frame 60 in position in the guide member. This arc has its center substantially at the point where the vertical plane of the cables meets the curved surface of the drum.

The drive shaft 92 rotates and moves forward in a straight line. The groove, pin and swivel connection allows for the arcuate movement and tilting of the guide member as it is moved forward and rearward. Other suitable means for connecting the drive shaft to the guide member will be apparent to those skilled in the art and may be substituted for that specifically shown.

Figures 3, 4, 5:
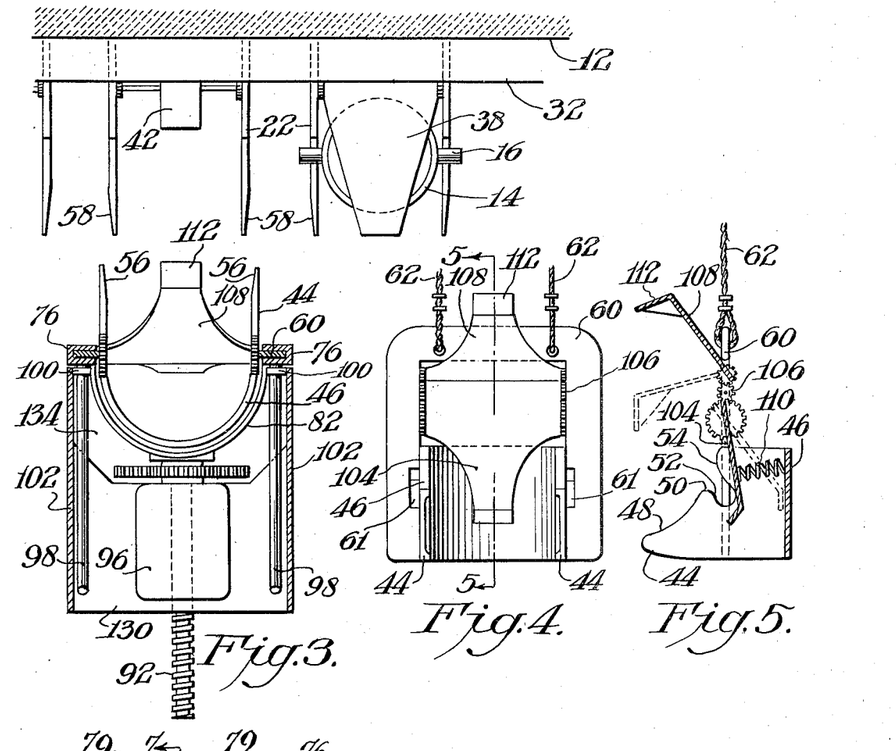
Fig. 3 is a plan view in cross-section taken on line 3—3 of Fig. 1.
Fig. 4 is a front view of the hose elevator, separated from the rest of the apparatus.
Fig. 5 is a side view in cross-section, taken on the line 5—5 of Fig. 4.

In the illustrated structure of our invention, the elevator arms will be provided with safety means similar to that with which the rack arms are provided. Such safety means comprises a downwardly-extending arm 104 connected by gearing 106 to an upper arm 108. The lower arm 104 is normally pressed forward by a spring 110 or its equivalent, so as to hold the arm 108 in its upward and rearward inoperative position as shown in solid lines in Figs. 4 and 5. The arm 108 has a downwardly-depending flat face 112 at the outer end thereof adapted to engage the face 42 of the corresponding safety means in the rack arms. When a hose is positioned in the elevator arms, it engages the lower arm 104 and forces it to the rear. This causes the arm 108 to extend forward, as shown in the broken lines in Fig. 5 and in solid lines in Fig. 1. The safety means in the elevator arms and in the rack arms are connected in circuit with a switch, which, when the circuit is closed, operates to stop and reverse the motor 96. The electrical connections and switch are not completely shown, as they are merely conventional and will be apparent to a skilled electrician. If the elevator arms contain a hose and the apparatus is accidentally operated to place such hose into rack arms already containing a hose, the face 112 will make contact with the face 42 before any damage can be done, and the contact of these faces will close the circuit and operate the switch to stop and reverse the motor 96 to return the guide member 76 to its normal position. Either or both of the arms 108 and 38 may be flexible or may be yieldingly mounted so as to allow for any delay between the closing of the electrical circuit and the reversal of the motion of the guide member.

The drums are mounted in the frame 102 which comprises two spaced walls connected by braces 114. These walls are supported on a base plate 116 provided with apertures 118 for the passage of the cables 62. The base plate 116, in turn, is provided with roller bearings 120 engaging the supporting angle beam 122 and supporting channel beam 124 rigidly mounted in the tower. Supported on the base plate 116 are bearings 126 for a threaded drive shaft 128 operated by motor 166 for moving the base plate 116, frame 102 and the various elements supported therein, along the supporting beams 122 and 124 in a direction parallel with the hose rack.

The motor 96 is supported on a base plate 130 supported in the frame 102. The bearing 132 for the shaft 92 is supported on a base plate 134 also supported in the frame 102.

Figure 11:
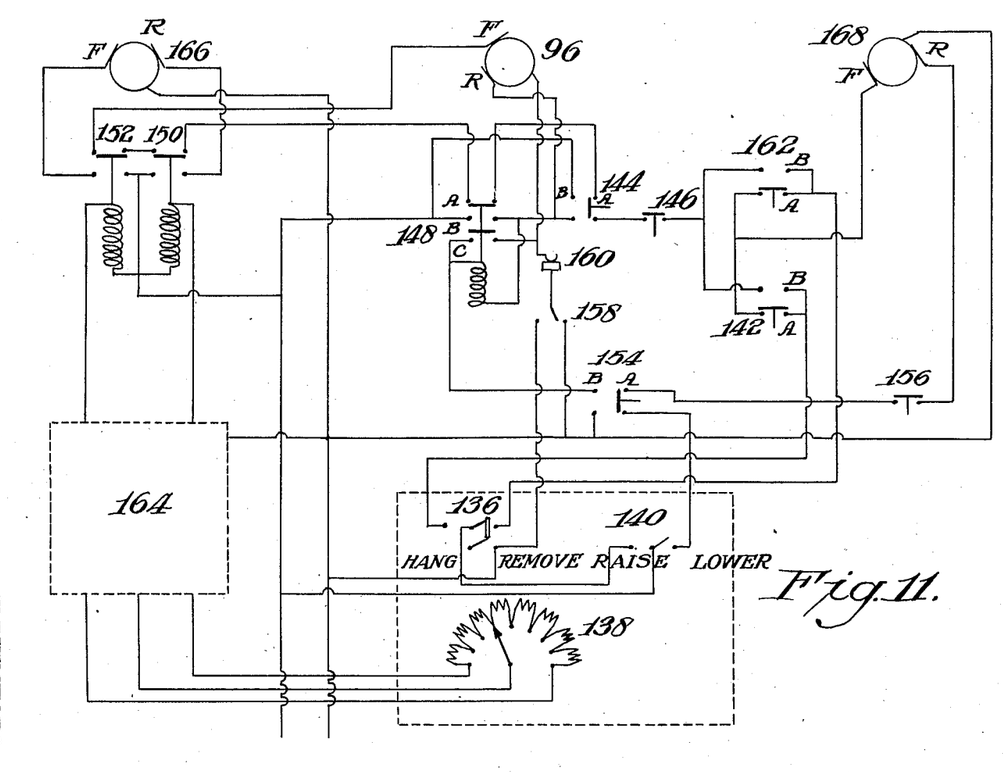
Fig. 11 is a wiring diagram for the preferred mode of operation of the apparatus.

The various motors are connected to a controlling switchboard (not shown), placed near the bottom of the tower, by suitable wiring shown in Fig. 11 so that the entire apparatus may be operated by a person at the base of the tower.

The operation of the preferred embodiment of our invention, as shown in the drawings, will first be described.

When it is desired to hang a section of hose in the rack, the designated switch 140 will be turned to operate the motor 168 to cause the elevator arms to be lowered to the base of the tower. If necessary, an adapter such as 14 will be attached to the end of the section of hose and then placed in the elevator arms. Then switch 140 will be turned which will cause the motor 168 and drums 66 and 68 to raise the elevator arms to the position shown in dotted lines in Fig. 1, the frame 60 entering the guide 76 and being positioned opposite the rack. The appropriate switch 138 will then be turned to operate the motor 166 to move the frame 102 along its tracks 122 and 124 to position the guide member opposite the selected pair of rack arms. The motor 96 will then operate to force the guide member forwardly until the elevator arms overlap the rack arms and the transverse notches in the elevator arms are in the vertical plane of the transverse notches in the rack arms. As the elevator arms move forwardly, the lugs 16 will engage the sloping surface 24 and be forced to ride up such surface and over the peak 26 and into the transverse notches in the rack arms. During this operation, the surfaces 54 will engage the lugs to force them forward and up the surface 24. Also, the elevator arms have an upward or lifting motion which assists the movement of the lugs up the surfaces 24. The lugs 16 will then be in a horizontal plane above the peak 50 of the elevator arms, so that, as the motor 96 is automatically reversed and the elevator arms moved to their normal position, the hose will be left in the rack.

When it is desired to remove a section of hose from the rack, switch 138 will be operated to position the frame 102, the guide 76 and the elevator arms opposite the desired pair of rack arms containing the selected section of hose. Switch 142 will then be operated which will cause the elevator arms to be moved into the position shown in solid lines in Fig. 1 and to cause the motor 96 to move the guide member and elevator arms forwardly until the elevator arms overlap the rack arms and the transverse notch in the elevator arms lies in the vertical plane of the transverse notch in the rack arms. As the elevator arms move forwardly, the sloping surfaces 48 will engage the lugs 16, forcing such lugs to ride upwardly over such surfaces and over the peaks 50 and into the notches 52. The surfaces 30 hold the lugs against rearward motion and force them to ride up the surfaces 48. The notches 52 will then be in a horizontal plane above the peaks 26 so that, as the motor 96 is automatically reversed and the elevator arms are moved back to their normal position, the elevator arms will carry the section of hose with them. When the elevator arms have been moved to their normal position beyond the ends of the rack arms, the motor 168 and drum will be operated to lower the elevator arms and the section of hose to the base of the tower where the section of hose may be removed from the elevator arms.

Referring now more particularly to the wiring diagram of Fig. 11, when it is desired to hang a section of hose in the tower, switch 140 is thrown to the lowering position whereby hoist motor 168 is activated to lower the elevator for placing a hose in the elevator. Then, switch 136 is thrown to hang position and switch 138 is thrown to select the proper pair of rack arms. Switch 140 is then thrown to the raise position which activates hoist motor 168 to raise the elevator to a position opposite the rack and to activate motor 166 through a positioning control unit 164 of conventional construction to move the elevator opposite the proper rack arms. When the elevator reaches a position opposite the rack, it throws switch 142 from position A to position B, disconnecting the hoist motor and closing the circuit to the inserting motor 96 through the normally closed contacts of switches 144 and 146 and the normally closed contacts of relays 148, 150 and 152. When the inserting motor 96 starts the elevator toward the rack, switch 154 is thrown from position A to position B, further breaking the circuit to hoist motor 168 and preventing accidental lowering of the elevator. The placing of the hose in the rack, operates switch 144 to throw it from position A to position B, reversing the inserting motor 96, and energizing relay 148 to move the switch of relay 148 from position A to position B and to establish contact through C. The movement of the elevator away from the rack causes switch 144 to be thrown from position B to position A; however, relay 148 is still energized by the contacts in position B and causes motor 96 to continue the rearward motion of the elevator to its normal position. When the elevator is returned to its normal position, switch 154 is thrown from position B to position A to de-energize relay 148 and break the circuit to motor 96.

If it is desired to hang another hose in the rack, switch 140 is thrown to the lowering position which operates the hoist motor to lower the elevator to the starting position. If the operator fails to stop the lowering of the elevator when it reaches the proper position for the placing of a section of hose thereon, switch 156 will be thrown to automatically disconnect the hoist motor from the circuit.

There is a switch 158 provided for each pair of rack arms. Each switch 158 is provided with a contact for connection through brush contact 160. The placing of a hose in a pair of rack arms will cause switch 158 to be thrown from position A to position B, thereby breaking the circuit to the motor 96 through the brush contact. Therefore, if an attempt is made to insert a second section of hose in a pair of rack arms containing a section of hose, motor 96 will fail to operate to move the elevator toward the rack arms. However, motor 96 will be connected in circuit for the removal of a section of hose from a pair of rack arms by the throwing of switch 136 to the remove position, motor 96 being then in circuit through switch 158 in B position.

If it is desired to remove a section of hose from the rack, switch 136 is thrown to remove position and switch 138 is moved to select the pair of rack arms which carry the particular section of hose desired. Switch 140 is then thrown to raise position, which activates the hoist motor 168 to raise the elevator to the remove position and also activates position motor 166 to move the elevator to the proper position. Now, when the elevator reaches the position opposite the selected pair of rack arms, it throws switch 162 from position A to position B, disconnecting the hoist motor and closing the circuit to the inserting motor 96. The rest of the switches and motors then continue to operate in the same manner as when a section of hose is inserted into the rack.

Switch 146 is in series with switch 144 in A position. Switch 146 is operated by contact with a hose in the elevator when the elevator is raised to remove position opposite rack arms which already contain a section of hose. Thus, switch 146 prevents the operation of motor 96 when it is attempted to remove a hose from a pair of rack arms while the elevator contains a section of hose. Switch 140 can then be turned to lowering position and switch 146 will drop back into place when the elevator starts down.

Figure 1:
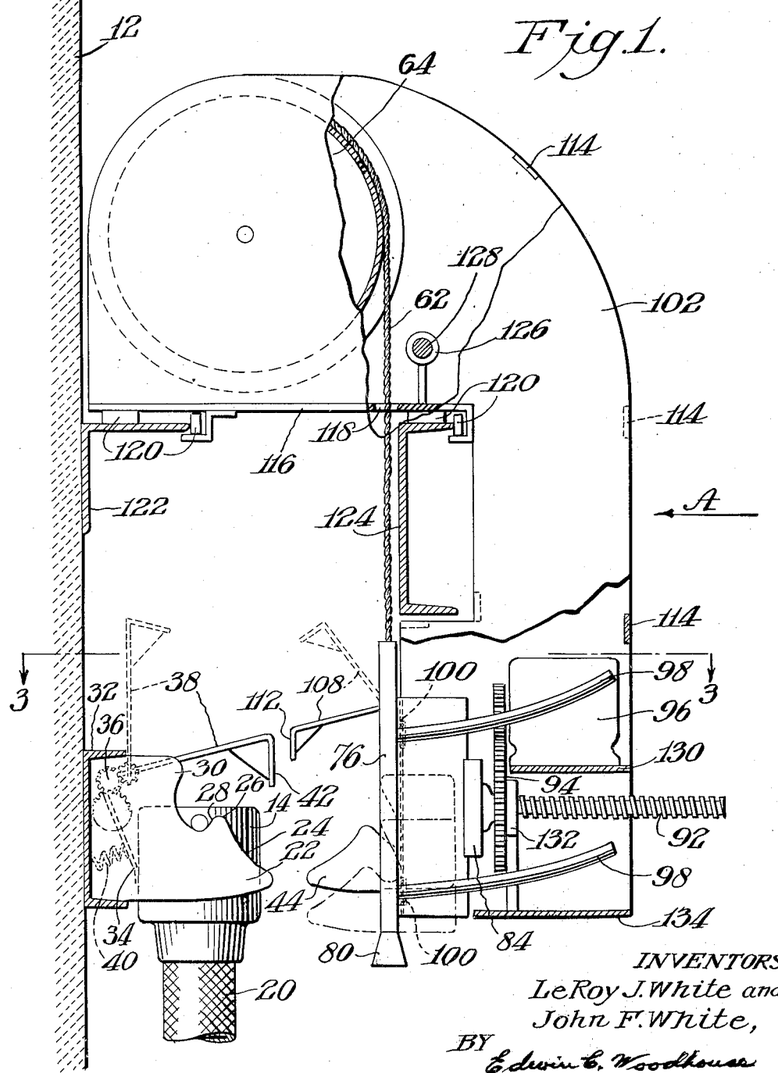
Fig. 1 is a side view of the novel hose hanging apparatus of our invention, with parts broken away and parts in section for clearness of illustration.

The safety means hereinbefore described and shown, particularly in Fig. 1, as being associated with the rack arms and the elevator, may be employed in place of or in addition to switches 158 and 146. If employed in addition to switches 158 and 146, they will become operative in the event of failure of such switches. If the elevator contains a section of hose and it is moved toward a pair of rack arms also containing a section of hose, face 112 of the arm 108 of the elevator safety means will contact the face 42 of the arm 38 of the rack safety means and such contact will throw switch 144 from position A to position B, causing motor 96 to reverse. Face 42 is of sufficient vertical height so that face 112 will contact it whether the elevator is in inserting or removing position. The repeated reversing of motor 96 and oscillation of the elevator will warn the operator of trouble and he can then throw switches to stop the apparatus or throw switch 136 to neutral position and switch 140 to lowering position to thereby lower the elevator for removal of the hose. Alternatively, the operator can throw switch 136 to neutral position and then throw switch 138 to select a pair of empty rack arms, and, finally, throw switch 136 to hang position.

The operation of the apparatus and the structure may be considerably varied. If it is desired to provide for the automatic hanging of the hose solely, and to remove the hose from the rack manually or in some other desired manner, this can be accomplished by providing the hose rack as described and eliminating the upwardly and rearwardly sloping surfaces 48 on the elevator arms. On the other hand, if it is desired to provide for the automatic removal of the section of hose from a hose rack solely, and to employ manual or other means for placing the hose in the rack, our type of hose elevator may be employed with the ordinary type of hose rack. Also, if desired, the elevator may be operated so as merely to raise and lower the hose to and from the level of the rack opposite a selected pair of rack arms, and then transfer the hose, from the elevator arms to the rack arms and from the rack arms to the elevator arms, solely by hand.

The operation of our apparatus may be further varied by raising the elevator arms to a position such that, when they are moved forwardly, the notches and the lugs 16 will pass above the hose rack to a position where the notches in the elevator arms will be in the vertical plane of and above the notches in the rack arms. The elevator arms can then be lowered to a position where the notches therein will be below the notches in the rack arms, in the course of which lowering, the lugs 16 will engage the notches in the rack arms and the section of hose will be suspended from the rack arms. The rearward movement of the elevator arms would then leave the section of hose suspended in the rack arms. A section of hose can be removed from the rack arms by a reversal of this last-described movement of the elevator arms. If this method of operation is followed, it will be unnecessary to provide the rack arms and the elevator arms with upwardly and backwardly sloping surfaces, but the rack arms may be of the usual form and the elevator arms may be formed similarly.

The materials of construction and dimensions of the various parts may be varied as desired. Generally, the parts will be made of metal, such as iron or steel, which will render them sufficiently strong and rigid for the purpose. Preferably, the rack arms, elevator arms and elevator frame will be as thin as possible while being of sufficient thickness to give them the strength necessary to withstand the stresses and strains to which they will be subjected. The same considerations apply as to the height of the rack arms and elevator arms and, particularly, of the height of the notches above the lower edges. The height of the rack arms and elevator arms above the notches should be greater than the highest position to which the lugs will be moved during the operation of transferring the section of hose from one pair of arms to the other. Preferably, the surfaces 24 and 48 will slope at an angle of from about 30° to about 60° from the horizontal. The effective angle of the sloping surfaces 48 will be decreased by the tilting of the elevator arms as they are swung forward. If the material of construction and thickness of the arms are such as to provide sufficient strength and rigidity, the surfaces 24 and 48 may slope at an appropriately smaller angle.

The safety means, provided in the rack arms and elevator arms, may be omitted, if desired. Also, other forms of safety means may be substituted therefor.

Still other modifications and variations can be made in the details of construction hereinbefore given without departing from the spirit or scope of our invention. For example, the motors and electrical connections may be eliminated, wholly or in part, and the various parts of the apparatus operated manually as by cranks and the like. Also, when the apparatus is used for hanging oil-well tubing, sucker rods and the like, details of construction may be modified to more particularly adapt it to such uses. Accordingly, our invention is not to be restricted to the specific embodiment shown in the drawings and described in detail herein, but we intend to cover our invention broadly, as in the appended claims.

We claim:

1. Hanging apparatus, for hanging a section of hose and the like which has a pair of round lugs projecting outwardly for a substantial distance from opposite sides of one end thereof, comprising a stationary rack adapted to be fastened to a wall of a tower near the top thereof and including a pair of spaced outwardly extending stationary rack arms having transverse lug-receiving notches in their upper surfaces and lug-engaging surfaces sloping upwardly and backwardly to the notches, the rack arms being spaced apart by a distance slightly greater than the outer diameter of a hose but less than the distance between the outer ends of the lugs; and elevator and transfer means comprising a pair of spaced elevator arms having transverse lug-receiving notches in their upper surfaces and lug-engaging surfaces sloping upwardly and backwardly to the notches, the elevator arms being spaced apart by a distance slightly different than the rack arms but greater than the outer diameter of a hose, means for raising and lowering said elevator arms to and from a position opposite to but spaced from the rack arms, and means for moving the elevator arms forwardly until the notches thereof are in the transverse vertical plane of the notches of the rack arms and for returning the elevator arms to a position beyond the ends of the rack arms.

2. Hanging apparatus, for hanging a section of hose and the like which has a pair of round lugs projecting outwardly for a substantial distance from opposite sides of one end thereof, comprising a stationary rack adapted to be fastened to a wall of a tower near the top thereof and including a plurality of pairs of spaced outwardly extending stationary rack arms, each pair of rack arms having transverse lug-receiving notches in their upper surfaces and lug-engaging surfaces sloping upwardly and backwardly to the notches, each pair of rack arms being spaced apart by a distance slightly greater than the outer diameter of a hose but less than the distance between the outer ends of the lugs; and elevator and transfer means comprising a pair of spaced elevator arms having transverse lug-receiving notches in their upper surfaces and lug-engaging surfaces sloping upwardly and backwardly to the notches, the elevator arms being spaced apart by a distance slightly different than the rack arms but greater than the outer diameter of a hose, means for raising and lowering said elevator arms to and from a position opposite to but spaced from the rack arms, and means for moving the elevator arms forward until the notches thereof are in the transverse vertical plane of the notches of the rack arms and for returning the elevator arms to a position beyond the ends of the rack arms, said elevator and transfer means being supported for transverse movement along the length of the rack; and means for moving the elevator and transfer means to a position opposite a selected pair of rack arms.

3. Hanging apparatus, for hanging a section of hose and the like which has a pair of round lugs projecting outwardly for a substantial distance from opposite sides of one end thereof, comprising a rack adapted to be fastened to a wall of a tower near the top thereof and including a pair of spaced outwardly extending thin rack arms of substantial height, the outer vertical edge of each rack arm sloping upwardly and backwardly for a substantial portion of its height, then backwardly and downwardly to form a transverse notch and then substantially vertically from the back of the notch for a substantial distance above the outer edge of the notch, the rack arms being spaced apart by a distance slightly greater than the outer diameter of a hose but less than the distance between the outer ends of the lugs, the notches being of a size to loosely receive and retain the lugs; and elevator and transfer means comprising a pair of spaced forwardly extending thin elevator arms of substantial height normally spaced outwardly from the ends of the rack arms, the forward vertical edge of each elevator arm sloping upwardly and backwardly for a substantial portion of its height, then backwardly and downwardly to form a transverse notch and then upwardly and slightly forward from the back of the notch for a substantial distance above the front edge of the notch, the elevator arms being spaced apart by a distance slightly different than the rack arms but greater than the outer diameter of a hose, the notches being of a size to loosely receive and retain the lugs, means for raising and lowering said elevator arms, a guide member positioned on a level with and opposite the rack arms but normally spaced beyond the ends thereof by a distance greater than the distance from the ends of the elevator arms to the transverse notches therein, said guide member being adapted to receive and guide the elevator arms into position, and means for moving the guide member and elevator arms forward, until the notches of the elevator arms are in the transverse vertical plane of the notches in the rack arms, and for returning the guide member to its normal position.

4. Hose-hanging apparatus, for hanging a section of hose having round lugs projecting outwardly for a substantial distance from opposite sides of one end thereof, comprising a hose rack adapted to be fastened to a wall of a hose tower near the top thereof and including a pair of spaced outwardly extending thin rack arms of substantial height, the outer vertical edge of each rack arm sloping upwardly and backwardly for a substantial portion of its height, then backwardly and downwardly to form a transverse notch and then substantially vertically from the back of the notch for a substantial distance above the outer edge of the notch, the rack arms being spaced apart by a distance slightly greater than the outer diameter of a hose but less than the distance between the outer ends of the lugs, the notches being of a size to loosely receive and retain the lugs; and hose elevator and transfer means comprising a pair of spaced forwardly extending thin elevator arms of substantial height normally spaced outwardly from the ends of the rack arms, the forward vertical edge of each elevator arm sloping upwardly and backwardly for a substantial portion of its height, then backwardly and downwardly to form a transverse notch and then upwardly and slightly forward from the back of the notch for a substantial distance above the outer edge of the notch, the elevator arms being spaced apart by a distance slightly greater than the rack arms, the notches being of a size to loosely receive and retain the lugs, a thin inverted U-shaped frame in the vertical plane of the notches of the elevator arms rigidly attached to and carrying the elevator arms between the lower ends of its legs, means for raising and lowering said frame and elevator arms comprising cables attached to the upper horizontal portion of said frame and a rotatable drum upon which the said cables are wound, an inverted U-shaped double-walled guide member positioned on a level with and opposite the rack arms but normally spaced beyond the ends thereof by a distance greater than the distance from the ends of the elevator arms to the transverse notches therein, said guide member being of slightly larger dimensions than the elevator frame and having its walls spaced apart by a distance slightly greater than the thickness of the elevator frame so that the elevator frame may enter the guide member and be guided into position thereby, means for positively moving the guide member forward until the notches of the elevator arms are in the transverse vertical plane of the notches in the rack arms and for returning the guide member to its normal position when the elevator frame is positioned in the guide member, guide rods secured to the back of the guide member for supporting the guide member and guiding its movement in the desired path, said rods being curved on an arc having its center substantially at the point where the vertical plane of the cables meets the curved surface of the drum, and bearings for the guide rods.

5. Hanging apparatus for hose and the like comprising a stationary rack including a pair of stationary rack arms having transverse lug-receiving notches in their upper edges, said rack arms being spaced apart by a distance slightly greater than the outer diameter of a hose; and elevator and transfer means including a pair of spaced forwardly extending thin elevator arms of substantial height, the forward vertical edge of each elevator arm sloping upwardly and backwardly for a substantial portion of its height, then backwardly and downwardly to form a transverse notch and then upwardly and slightly forward from the back of the notch for a substantial distance above the outer edge of the notch, the elevator arms being spaced apart by a distance slightly greater than the diameter of a hose, and the notches being of a size to loosely receive and retain lugs on the end of a section of hose, and means for raising and lowering the elevator arms, and means for moving the elevator arms forward to an overlapping position with the rack arms and the notches in the elevator arms to a position slightly above the level of the notches in the rack arms and to bring the forward vertical sloping edges of the elevator arms into engagement with lugs on the end of a hose resting in the notches of the rack arms and force such lugs to ride up such sloping edges out of the notches in the rack arms and into the notches in the elevator arms, and to bring the elevator arms back to the normal position.

6. Hose-hanging apparatus including a hose rack comprising a pair of spaced outwardly extending rack arms having transverse lug-receiving notches in their upper edges, said rack arms being spaced apart by a distance slightly greater than the outer diameter of a hose, a pivotally mounted arm extending between the rack arms and normally held yieldingly in the path of a hose to be placed between the rack arms, a second arm connected to the first arm and adapted to be moved by movement of the first arm from its normal position, into a position to prevent the insertion of a second hose between the rack arms.

7. Hose-hanging apparatus comprising a hose rack including a pair of spaced outwardly extending rack arms having transverse lug-receiving notches in their upper edges, said rack arms being spaced apart by a distance slightly greater than the outer diameter of a hose; a pair of spaced elevator arms having transverse lug-receiving notches in their upper edges, the elevator arms being spaced apart by a distance slightly different from the rack arms but greater than the outer diameter of a hose and being normally positioned beyond the ends of the rack arms; elevating means for raising and lowering the elevator arms; transfer means for moving the elevator arms forward to an overlapping position with the rack arms to bring the notches in the elevator arms into the transverse vertical plane of the notches in the rack arms and back to normal position; safety means associated with the rack arms, and safety means associated with the elevator arms, both safety means being connected with the transfer means and cooperating to prevent operation of the transfer means when both pairs of arms contain a hose.

8. Hanging appartus, for hanging a section of hose and the like which has a pair of lugs projecting outwardly for a substantial distance from opposite sides of one end thereof, comprising a rack including a pair of spaced outwardly extending rack arms having transverse lug-receiving notches in their upper edges, said rack arms being spaced apart by a distance slightly greater than the outer diameter of a hose, a pair of spaced elevator arms having transverse lug-receiving notches in their upper edges, the elevator arms being spaced apart by a distance slightly different than the rack arms but greater than the diameter of a hose and being normally positioned beyond the ends of the rack arms, elevating means for raising and lowering the elevator arms, a guide member positioned on a level with and opposite the rack arms but normally spaced beyond the ends thereof by a distance greater than the distance from the ends of the elevator arms to the transverse notches therein, said guide member being adapted to receive and guide the elevator arms into position, and means for moving the guide member and elevator arms forward to bring the elevator arms into an overlapping position with the rack arms and to bring the notches in the elevator arms into the transverse vertical plane of the notches in the rack arms and back to the normal position to thereby transfer a section of hose from one pair of arms to the other pair of arms.

9. Hanging apparatus, for hanging a section of hose and the like which has a pair of round lugs projecting outwardly for a substantial distance from opposite sides of one end thereof, comprising a rack adapted to be immovably fastened to a wall of a tower near the top thereof and including a plurality of pairs of spaced outwardly extending stationary rack arms, each pair of rack arms having transverse lug-receiving notches in their upper surfaces, each pair of rack arms being spaced apart by a distance slightly greater than the outer diameter of a hose but less than the distance between the outer ends of the lugs; and elevator and transfer means comprising a pair of spaced elevator arms having transverse lug-receiving notches in their upper surfaces, the elevator arms being spaced apart by a distance slightly different than the rack arms but greater than the outer diameter of a hose, means for raising and lowering said elevator arms to and from a position opposite to but spaced from the rack arms, a guide member positioned on a level with and opposite the rack arms but normally spaced beyond the ends thereof by a distance greater than the distance from the ends of the elevator arms to the transverse notches therein, said guide member being adapted to receive and guide the elevator arms into position, and means for moving the guide member and elevator arms forward until the notches thereof are in the transverse vertical plane of the notches of the rack arms and for returning the guide member and elevator arms to a position beyond the ends of the rack arms, said elevator and transfer means being supported for transverse movement along the length of the rack; and means for moving the elevator and transfer means to a position opposite a selected pair of rack arms.

10. Hanging apparatus for hose and the like comprising a rack adapted to be immovably fastened to a wall of a tower and including a pair of spaced outwardly extending, stationary, thin rack arms of substantial height, the outer vertical edge of each rack arm sloping upwardly and backwardly for a substantial portion of its height, then backwardly and downwardly to form a transverse notch and then substantially vertically from the back of the notch for a substantial distance above the outer edge of the notch, the rack arms being spaced apart by a distance slightly greater than the outer diameter of a hose and the notches being of a size to loosely receive and retain lugs on the end of a section of hose; a pair of spaced elevator arms having transverse lug-receiving notches in their upper edges, the elevator arms being spaced apart by a distance slightly different than the rack arms but greater than the outer diameter of a hose and being normally positioned beyond the ends of the rack arms; elevating means for raising and lowering the elevator arms, and means for moving the elevator arms forward to an overlapping position with the rack arms and the notches in the elevator arms to a position slightly below the level of the notches in the rack arms and to bring the lugs on the end of a hose resting in the notches of the elevator arms into engagement with the outer sloping vertical edges of the rack arms and force such lugs to ride up such sloping edges out of the notches in the elevator arms and into the notches in the rack arms, and to bring the elevator arms back to the normal position.

LE ROY J. WHITE.
JOHN F. WHITE.

REFERENCES CITED

The following references are of record in the file of this patent:

UNITED STATES PATENTS

| Number | Name | Date |
|---|---|---|
| D. 45,139 | Berry | Jan. 13, 1914 |
| 434,858 | Berry | Aug. 19, 1890 |
| 478,731 | Bancroft et al. | July 12, 1892 |
| 765,109 | Sticker | July 12, 1904 |
| 1,089,650 | Kile | Mar. 10, 1914 |
| 1,332,326 | Dubois | Mar. 2, 1920 |
| 1,447,694 | Stoney et al. | Mar. 6, 1923 |
| 1,460,448 | Shampay | July 3, 1923 |
| 1,776,605 | Tibbetts | Sept. 23, 1930 |
| 2,102,966 | Nash | Dec. 21, 1937 |
| 2,113,712 | Robinson | Apr. 12, 1938 |
| 2,226,947 | Sheldon | Dec. 31, 1940 |
| 2,309,730 | Hastings | Feb. 2, 1943 |
| 2,341,350 | Young | Feb. 8, 1944 |

FOREIGN PATENTS

| Number | Country | Date |
|---|---|---|
| 197,707 | Switzerland | Aug. 1, 1938 |